United States Patent [19]
Aselu

[11] Patent Number: 5,123,335
[45] Date of Patent: Jun. 23, 1992

[54] COFFEE MAKER APPARATUS

[76] Inventor: Pullen Aselu, P.O. Box 1417, Austin, Tex. 78767

[21] Appl. No.: 740,121

[22] Filed: Aug. 5, 1991

[51] Int. Cl.$^5$ ............................................. A47J 31/40
[52] U.S. Cl. .......................................... 99/295; 99/304
[58] Field of Search ................. 99/279, 280, 281, 282, 99/283, 293, 290, 299, 300, 302 R, 304, 316; 222/129.3, 129.4, 189, 146.5, 185, 537, 564; 211/88; 248/224.4, 225.2; 220/231, 367; 426/433

[56] References Cited

U.S. PATENT DOCUMENTS

| | | | |
|---|---|---|---|
| 3,133,671 | 5/1964 | Christine et al. | 99/283 |
| 3,326,115 | 6/1967 | Karlen et al. | 99/283 |
| 3,530,787 | 9/1970 | Litterio | 99/299 |
| 3,635,380 | 1/1972 | Fitzgerald | 220/367 |
| 3,805,999 | 4/1974 | Syverson | 222/129.4 |
| 3,955,713 | 5/1976 | Hurley | 222/129.4 |
| 4,428,498 | 1/1984 | Obey | 220/367 |
| 4,757,752 | 7/1988 | Robins et al. | 99/279 |
| 4,815,633 | 3/1989 | Kondo et al. | 222/129.4 |

*Primary Examiner*—Harvey C. Hornsby
*Assistant Examiner*—Reginald L. Alexander
*Attorney, Agent, or Firm*—Leon Gilden

[57] ABSTRACT

A coffee maker is arranged for mounting within a transport vehicle, to include a housing with a water reservoir operative through an on/off switch to direct the water from within the reservoir to a drinking cup upon directing the water through coffee and a filtering apparatus. Coffee creamer and sugar dispensing containers are provided operative through valving. The coffee cup includes structure to include a drinking conduit in secure mounting to a top surface of the drinking cup, and the organization further including supporting tether construction to accommodate vibration directed to the apparatus when positioned within an associated vehicle.

8 Claims, 4 Drawing Sheets

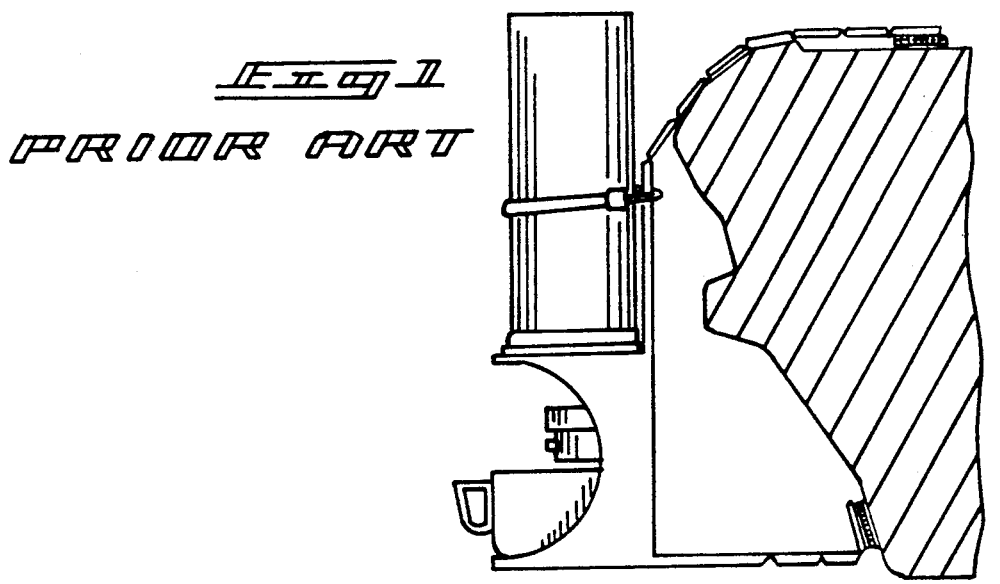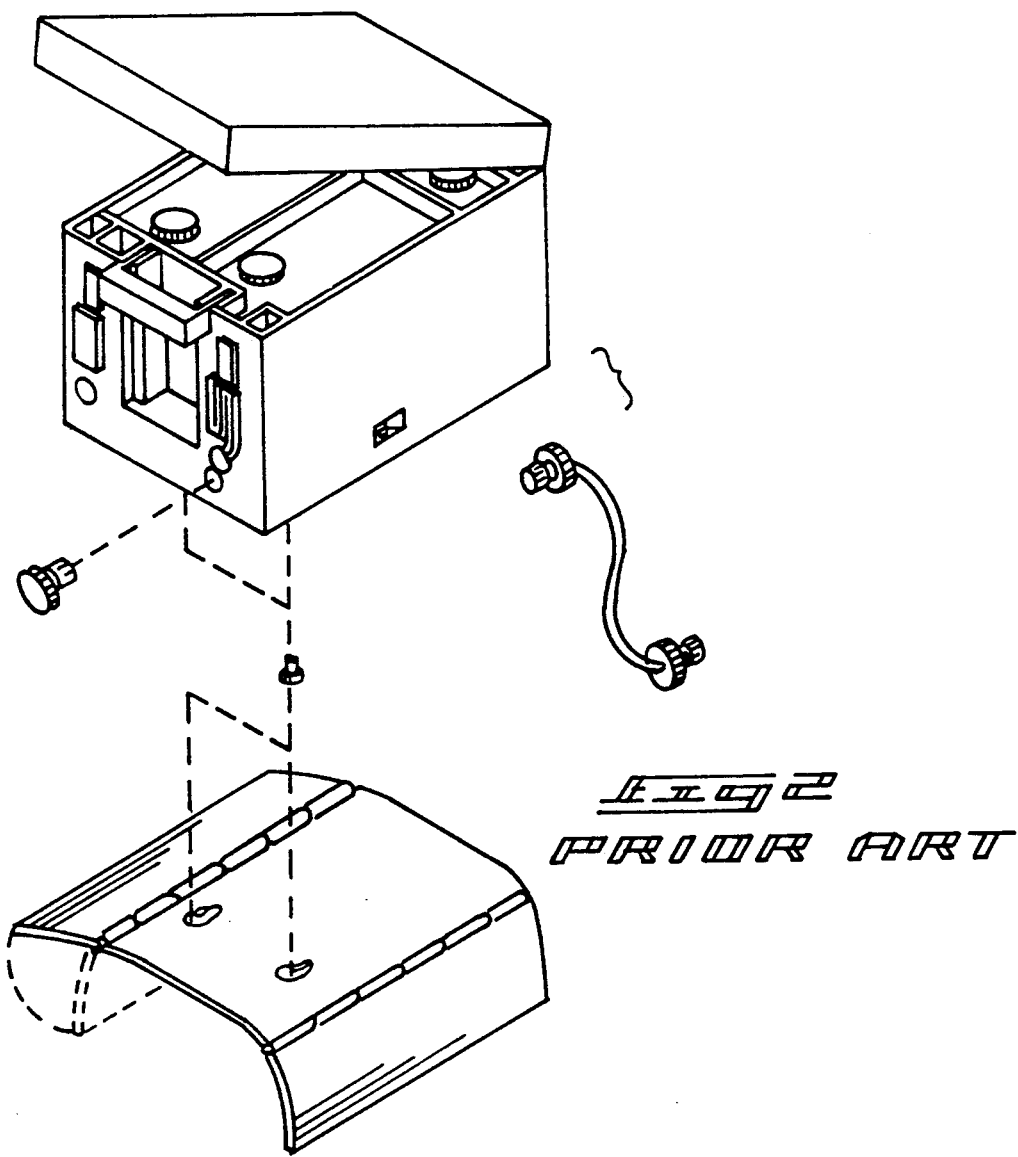

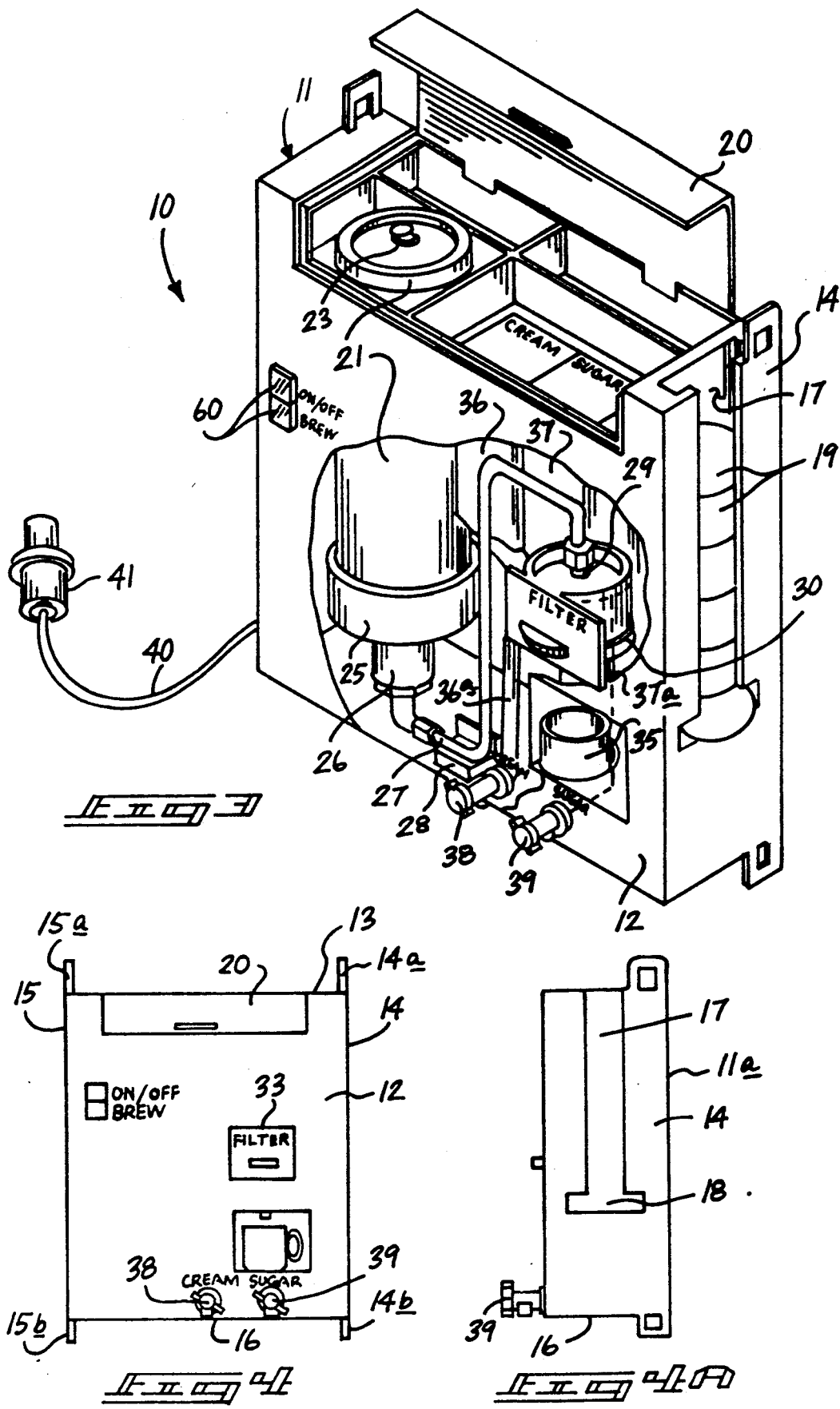

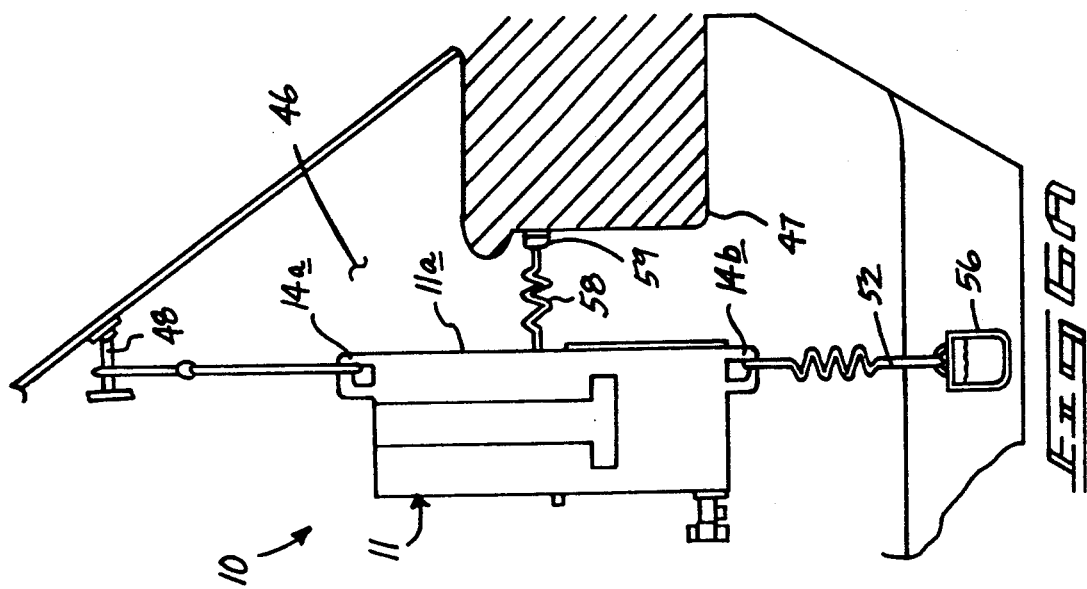
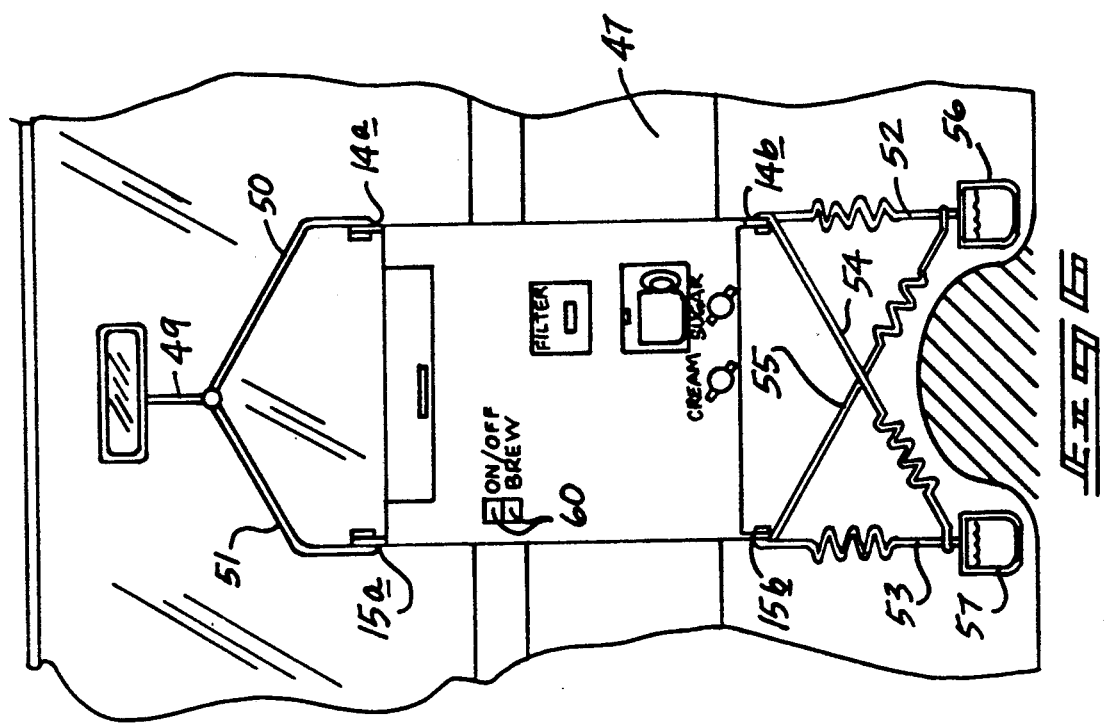

COFFEE MAKER APPARATUS

BACKGROUND OF THE INVENTION

1. Field of the Invention

The field of invention relates to dispensing apparatus, and more particularly pertains to a new and improved coffee maker apparatus wherein the same is arranged for providing a coffee beverage.

2. Description of the Prior Art

Portable beverage devices are utilized in the prior art for securement relative to associated vehicles for providing ease of access to such beverages as required. Such apparatus is exemplified in U.S. Pat. No. 4,913,318 to Forrester wherein a storage tank construction is arranged for mounting upon a transmission hump portion of a transport vehicle.

U.S. Pat. No. 4,303,109 to Cohen sets forth a beverage dispenser arranged for mounting to a dashboard of an associated vehicle.

U.S. Pat. No. 4,108,140 to Wolze sets forth a coffee pot holder for mounting within recreational vehicles, wherein the holder provides a cradle structure for mounting the coffee pot therewithin.

U.S. Pat. No. 4,852,843 to Chandler sets forth a beverage container for use in mounting within a self-propelled vehicle.

U.S. Pat. No. 4,927,060 to Snowball, et al. sets forth an apparatus for use in making beverages such as coffee.

As such, it may be appreciated that there continues to be a need for a new and improved coffee maker apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of coffee maker apparatus now present in the prior art, the present invention provides a coffee maker apparatus wherein the same is arranged for mounting within a self-propelled vehicle. As such, the general purpose of the present invention, which will be described subsequently in greater detail, is to provide a new and improved coffee maker apparatus which has all the advantages of the prior art coffee maker apparatus and none of the disadvantages.

To attain this, the present invention provides a coffee maker arranged for mounting within a transport vehicle, to include a housing with a water reservoir operative through an on/off switch to direct the water from within the reservoir to a drinking cup upon directing the water through the coffee and a filtering apparatus. Coffee creamer and sugar dispensing containers are provided operative through valving. The coffee cup includes structure to include a drinking conduit in secure mounting to a top surface of the drinking cup, and the organization further including supporting tether construction to accommodate vibration directed to the apparatus when positioned within an associated vehicle.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved coffee maker apparatus which has all the advantages of the prior art coffee maker apparatus and none of the disadvantages.

It is another object of the present invention to provide a new and improved coffee maker apparatus which may be easily and efficiently manufactured and marketed.

It is a further object of the present invention to provide a new and improved coffee maker apparatus which is of a durable and reliable construction.

An even further object of the present invention is to provide a new and improved coffee maker apparatus which is susceptible of a low cost of manufacture with regard to both materials and labor, and which accordingly is then susceptible of low prices of sale to the consuming public, thereby making such coffee maker apparatus economically available to the buying public.

Still yet another object of the present invention is to provide a new and improved coffee maker apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric side view, partially in section, of a prior art coffee support apparatus within a vehicle.

FIG. 2 is an isometric illustration of a further example of a beverage container for mounting within a vehicle.

FIG. 3 is an isometric illustration of the instant invention.

FIG. 4 is an orthographic frontal view, taken in elevation, of the instant invention.

FIG. 4a is an orthographic side view of the instant invention.

FIG. 6 is an orthographic frontal view of the invention mounted within a passenger compartment of a self-propelled vehicle.

FIG. 6a is an orthographic side view of the apparatus mounted within the passenger compartment of an associated transport vehicle.

DESCRIPTION OF THE PREFERRED EMBODIMENT

Figure 5:
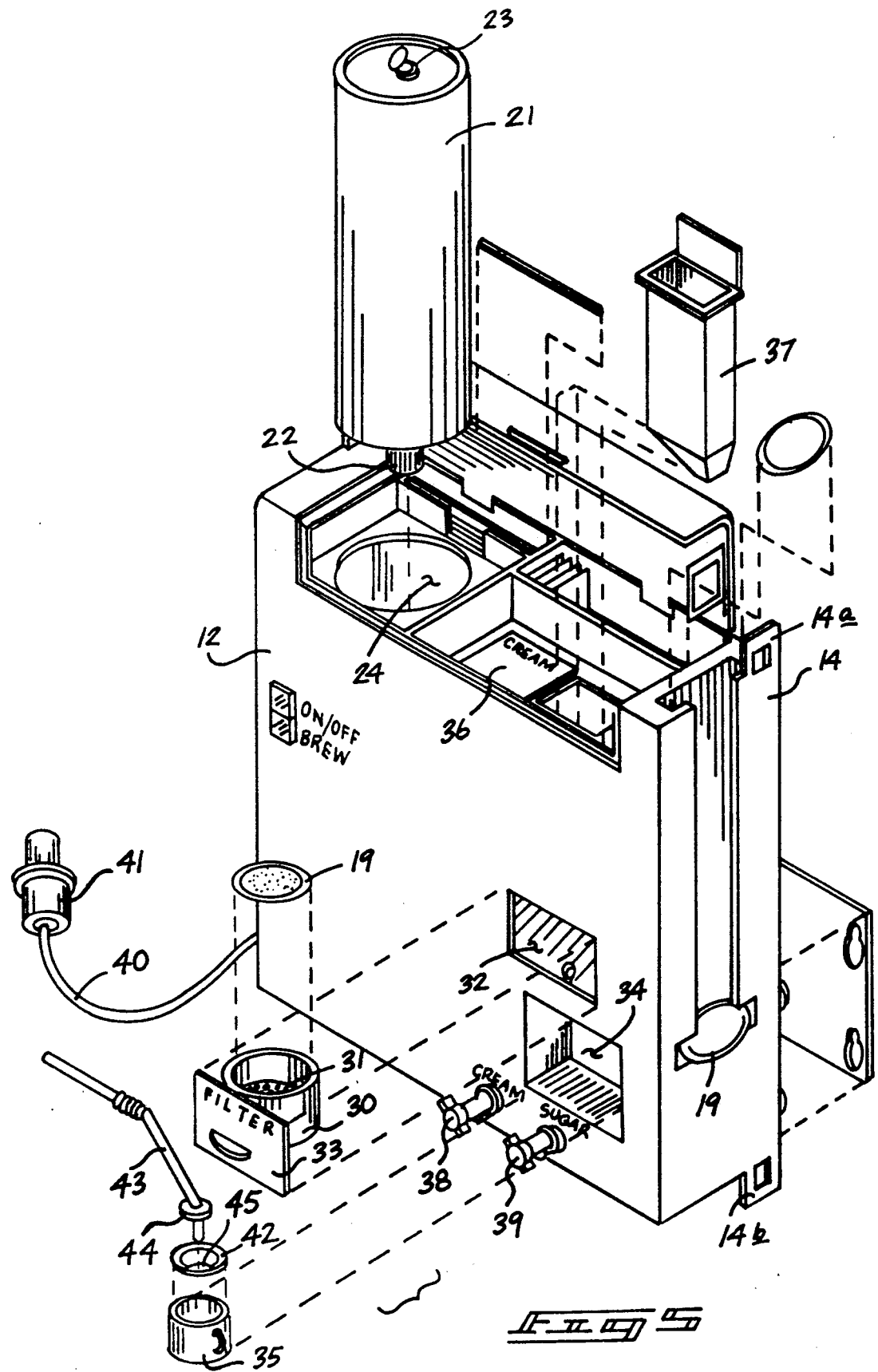
FIG. 5 is an isometric exploded view of the instant invention.

With reference now to the drawings, and in particular to FIGS. 1 to 6a thereof, a new and improved coffee maker apparatus embodying the principles and concepts of the present invention and generally designated by the reference numeral 10 will be described.

FIG. 1 illustrates a prior art coffee maker apparatus as set forth in U.S. Pat. No. 4,303,109, wherein a beverage container is mounted in an inverted orientation relative to a coffee cup for securement to a dashboard of an associated vehicle. The prior art structure of FIG. 2 is set forth in U.S. Pat. No. 4,913,318, wherein a beverage dispenser including heating tubes associated with each tank of a plurality of tanks is mounted upon a support plate for securement to a transmission hump structure of an associated vehicle.

More specifically, the coffee maker 10 essentially comprises a unitary housing 11, including a rear wall 11a, a front wall, a top wall 13, a right side wall 14, a left side wall 15, and a floor 16. The right side wall 14 includes a magazine slot 17 formed therewithin extending longitudinally of the right side wall, with an outlet opening 18 at a lower terminal end thereof defining a "T" shaped opening through the right side wall 14 containing a stacked series of porous filters 19 therewithin for use by the organization. A top wall lid 20 is hingedly mounted to the top wall at an intersection with the rear wall 11a to overlie a series of chambers within the housing 11. A water reservoir 21 is mounted within the housing, wherein the water reservoir is longitudinally aligned and arranged extending orthogonally between the top wall 13 and the floor 16, and includes a water reservoir outlet 22 formed at a lower terminal end thereof, with an air relief cap 23 at an upper terminal end thereof. The air relief cap 23 permits equalization of pressure within the fluid reservoir, or alternatively permits pressurizing of the reservoir to direct water through an associated fluid conduit 27 in fluid communication with the water reservoir 21 and its outlet 22. The fluid conduit 27 is mounted to a flow control valve 26 that is mounted to a reservoir receiving cup 25. The reservoir receiving cup 25 fixedly mounts the water reservoir 21 thereto aligning the outlet 22 relative to the flow control valve 26. The fluid conduit 27 is positioned through a heater 28 to effect heating of fluid within the fluid conduit and thereafter directs such fluid outwardly through a conduit nozzle 29 as the fluid passes therethrough. The conduit nozzle 29 is positioned over a filter cup 30, as illustrated. The filter cup 30 is mounted removably relative to a filter cup receiving cavity 32 directed through the front wall 12. The filter cup 30 includes an apertured cup floor 31 to overlie a drinking cup cavity 34 mounting a drinking cup 35 therewithin. The filter cup 32 is further provided with a positioning plate 33 tangentially and fixedly mounted to the filter cup 30 defined by a perimeter greater than the filter cup receiving cavity 32 to provide abutment surface for mounting the filter cup within the cavity 32.

The housing 11 further includes a cream dispenser 36 and a sugar dispenser 37 arranged in adjacency relative to one another and adjacent the water reservoir 21, wherein the cream dispenser 36, the sugar dispenser 37, and the water reservoir 21 are generally arranged in a parallel relationship relative to one another within the housing, with a cream dispenser conduit 36a in communication with the cream dispenser at a lower terminal end thereof and operative through a cream dispenser valve 38 mounted within the front wall to permit selective flow of a cream powder or fluid therethrough. The sugar dispenser 37 is operative through a sugar conduit 37a and is in communication with a sugar dispenser valve 39 adjacent the cream dispenser valve 38 directed through the front wall for providing selective dispensing of granular sugar therethrough. An electrical supply line 40 includes a cigarette plug member 41 to direct electrical energy through an on/off switch 60 for effecting selective operation of the device through circuitry available to one of ordinary skill in the art.

The drinking cup 35 includes an elastic cup lid 47 securable to an upper terminal end of the drinking cup 35, with the cup lid 42 including a lid opening 45 directed therethrough, and a drinking conduit 43, with a pivot junction medially thereof and includes a drinking conduit plug 44 mounted adjacent a lower terminal end of the drinking conduit for complementary reception within lid opening 45 to provide a spill-proff cup assembly for use by an individual positioned within the vehicle passenger compartment 46 of an associated transport vehicle. The passenger compartment 46 includes a dashboard 47 and a windshield rear view mirror and shaft 48, as illustrated in FIG. 6 for example. The shaft 48 includes a flexible and resilient mounting tether directed downwardly thereof secured to a respective right and left support rod 50 and 51. The right and left support rods 50 and 51 are each pivotally secured at their lower terminal ends to a respective right and left upper mounting tab 14a and 15a. A right and left lower mounting tab 14b and 15b each include a respective right and left support spring 52 and 53. A first cross-over spring 54 is directed from the lower right tab downwardly to a left fluid ballast 57, wherein a second cross-over support spring 55 is directed from the lower left tab to a right fluid ballast 56. The ballast and spring structure accommodates vibration and shock to the housing 11 in use within the compartment. Further, a rear wall mounting spring 58 orthogonally mounted to the rear wall 11a includes a positioning foot 59 in abutment with the dashboard 57 for positioning and locating the housing within the passenger compartment 46.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A coffee maker apparatus, comprising,
   a unitary housing, the housing including a rear wall, a front wall, a top wall, a right side wall, a left side wall, and a floor, and
   the housing including a water reservoir removably mounted within a first compartment within the housing, wherein the water reservoir includes a lower reservoir outlet, and an upper air relief cap, and wherein the reservoir outlet is received within a reservoir receiving cup fixedly mounted within the housing at a lower terminal end of the first compartment, the water receiving cup includes a fluid conduit directing fluid from the water reservoir through a heater assembly, and
   the fluid conduit including an outlet conduit nozzle, the outlet conduit nozzle positioned within a filter cup receiving cavity, the filter cup receiving cavity directed through the front wall within the unitary housing, and the filter cup receiving cavity including a filter cup removably mounted within the filter cup receiving cavity, the filter cup including an apertured cup floor, and
   the apertured cup floor in fluid communication with a drinking cup positioned below the filter cup receiving cavity, and the drinking cup positioned within a drinking cup cavity, the drinking cup cavity directed into the housing through the front wall positioned below the filter cup receiving cavity to receive the drinking cup therewithin, and
   switch means to direct fluid from the fluid reseroir through the fluid conduit and into the filter cup, and
   the housing includes a second compartment and a third compartment, and second compartment includes a cream dispenser, and the third compartment includes a sugar dispenser, the cream dispenser, the sugar dispense, and the water reservoir arranged in a parallel relationship relative to one another within the housing, and the cream dispenser includes a cream dispenser conduit, the sugar dispenser includes a sugar dispenser conduit, and the cream dispenser conduit and the sugar dispenser conduit are directed through the front wall below the drinking cup cavity, with a cream dispenser valve mounted to the front wall in fluid communication with the cream dispenser conduit, and a sugar dispenser valve mounted to the front wall in communication with the sugar dispenser conduit, wherein the cream dispenser valve and the sugar dispenser valve permit selective flow therethrough.

2. An apparatus as set forth in claim 1 wherein the reservoir receiving cup includes a flow control valve in fluid communication with the fluid conduit to meter fluid from the fluid reservoir to the fluid conduit.

3. An apparatus as set forth in claim 2 wherein the top wall includes a top wall lid hingedly mounted to the top wall adjacent the rear wall to overlie the first compartment, second compartment, and third compartment to provide access thereto.

4. An apparatus as set forth in claim 3 wherein the right side wall includes a magazine slot directed into the housing through the right side wall, the magazine slot including a lower outlet opening, the magazine slot including a plurality of porous filters therewithin for permitting positioning of a porous filter into the filter cup above the apertured cup floor.

5. An apparatus as set forth in claim 4 wherein the drinking cup includes an elastic cup lid securably mounted to an upper terminal end of the drinking cup, the cup lid including a lid opening directed medially therethrough, and a drinking conduit, the drinking conduit including a medially pivoted connection, and the drinking conduit including a drinking conduit plug fixedly mounted to the drinking conduit adjacent a lower terminal end of the drinking conduit, and the drinking conduit plug complementarily and securably mounted within the lid opening of the cup lid.

6. An apparatus as set forth in clamin 5 wherein the right side wall includes a right side wall upper mounting tab and a right side wall lower mounting tab, wherein the right side wall upper mounting tab projects above the top wall and the right side wall lower mounting tab projects below the floor, and the left side wall includes a left side wall upper mounting tab coplanar with the left side wall projecting above the top wall, and a left side wall lower mounting tab coplanar with the left side wall projecting below the floor, and the apparatus arranged for securement within a vehicle passenger compartment, the vehicle passenger compartment including a dashboard and a windshield rear view mirror, including a mirror shaft, and a flexible and resilient mounting tether arranged for selective securement to the mounting shaft, the mounting tether secured to a right support rod and a left support rod at an intersection of the right support rod and left support rod, wherein the right support rod is pivotally mounted to the right side wall upper mounting tab, the left support rod is pivotally mounted to the left side wall upper mounting tab.

7. An apparatus as set forth in claim 6 including a right support spring mounted to the right side wall lower mounting tab, and a left support spring mounted to the left side wall lower mounting tab, and a right fluid ballast mounted to the right support spring at a lower terminal end thereof, and a left fluid ballast mounted to the left support spring at a lower terminal end thereof, and a first cross-over spring mounted to the right side wall lower mounting tab and the left fluid ballast, and a second cross-over support spring mounted to the left side wall lower mounting tab and the right fluid ballast, wherein the right fluid ballast and left fluid ballast effect stability to the unitary housing when mounted within the passenger compartment.

8. An apparatus as set forth in claim 7 wherein the housing rear wall includes a rear wall mounting spring orthogonally and fixedly mounted to the housing rear wall, and the rear wall mounting spring including a positioning foot fixedly mounted at a free terminal end thereof spaced near a wall for abutment with the dashboard.

* * * * *